(12) United States Patent
Draznin et al.

(10) Patent No.: US 11,696,249 B2
(45) Date of Patent: Jul. 4, 2023

(54) MESSAGING METHOD, SYSTEM AND MOBILE DEVICE

(71) Applicant: Rakuten Mobile, Inc., Tokyo (JP)

(72) Inventors: Sagiv Draznin, Tokyo (JP); Tareq Amin, Tokyo (JP); Sharad Sriwastawa, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 200 days.

(21) Appl. No.: 17/183,351

(22) Filed: Feb. 24, 2021

(65) Prior Publication Data

US 2021/0266857 A1  Aug. 26, 2021

Related U.S. Application Data

(60) Provisional application No. 62/981,463, filed on Feb. 25, 2020.

(51) Int. Cl.
| | | |
|---|---|---|
| H04W 4/00 | (2018.01) | |
| H04W 60/04 | (2009.01) | |
| H04W 76/11 | (2018.01) | |
| H04W 88/18 | (2009.01) | |
| H04W 48/16 | (2009.01) | |
| H04W 4/80 | (2018.01) | |

(52) U.S. Cl.
CPC ............ *H04W 60/04* (2013.01); *H04W 4/80* (2018.02); *H04W 48/16* (2013.01); *H04W 76/11* (2018.02); *H04W 88/184* (2013.01)

(58) Field of Classification Search
CPC ... H04W 60/04; H04W 76/11; H04W 88/184; H04W 48/16; H04W 4/80; H04W 88/18
USPC ........................................................ 370/329
See application file for complete search history.

(56) References Cited

U.S. PATENT DOCUMENTS

| | | | | | |
|---|---|---|---|---|---|
| 5,581,804 | A | * | 12/1996 | Cameron | H04L 27/2647 455/524 |
| 5,590,403 | A | * | 12/1996 | Cameron | H04W 84/025 455/503 |
| 6,088,589 | A | * | 7/2000 | Valentine | H04W 68/02 455/433 |
| 11,229,076 | B2 | * | 1/2022 | Hwang | H04W 76/30 |
| 2007/0213072 | A1 | * | 9/2007 | Lim | H04W 4/02 455/456.1 |
| 2009/0203375 | A1 | * | 8/2009 | Gisby | H04M 7/0057 455/426.1 |
| 2014/0071967 | A1 | * | 3/2014 | Velasco | H04L 12/1403 370/338 |
| 2014/0073288 | A1 | * | 3/2014 | Velasco | H04W 4/02 455/411 |
| 2014/0073289 | A1 | * | 3/2014 | Velasco | H04W 12/04 455/411 |

(Continued)

*Primary Examiner* — Marceau Milord
(74) *Attorney, Agent, or Firm* — Hauptman Ham, LLP

(57) ABSTRACT

A messaging method includes causing a mobile device to be registered in a database by storing identification information associated with the mobile device in the database and storing network connectivity information indicative of whether the mobile device is connected to a wireless network in the database. The method also includes facilitating a message to be communicated to the mobile device from a messaging device remote from the mobile device by causing the identification information and the network connectivity information to be communicated to the messaging device.

14 Claims, 4 Drawing Sheets

(56) References Cited

U.S. PATENT DOCUMENTS

2016/0142868 A1* 5/2016 Kulkarni ................ H04W 4/80
                                                              455/456.5
2018/0321356 A1* 11/2018 Kulkarni ............ H04W 64/003
2018/0332434 A1* 11/2018 Kulkarni ................ H04L 43/10
2020/0396783 A1* 12/2020 Hwang ................ H04W 76/30

* cited by examiner

MESSAGING METHOD, SYSTEM AND MOBILE DEVICE

CROSS-REFERENCE TO RELATED APPLICATION

This application claims the benefit of U.S. Provisional Patent Application No. 62/981,463 filed on Feb. 25, 2020, the content of which is incorporated by reference herein in its entirety.

BACKGROUND

For many years emergency service providers used pagers as the main device for alerting emergency workers. However, pager services have largely been replaced or overshadowed by mobile phones. Mobile phone services are often unreliable, rendering emergency workers reliant on mobile phones unreachable in times of need.

SUMMARY

A method according to the present disclosure comprises: causing a mobile device to be registered in a database by storing identification information associated with the mobile device in the database and storing network connectivity information indicative of whether the mobile device is connected to a wireless network in the database; and facilitating a message to be communicated to the mobile device from a messaging device remote from the mobile device by causing the identification information and the network connectivity information to be communicated to the messaging device.

A system according to the present disclosure comprises: a mobile device; a messaging device separate from the mobile device; and an apparatus comprising a processor and a memory having computer-readable instructions stored thereon that, when executed by the processor, cause the apparatus to: cause the mobile device to be registered in a database by storing identification information associated with the mobile device in the database and storing network connectivity information indicative of whether the mobile device is connected to a wireless network in the database; and facilitate a message to be communicated to the mobile device from the messaging device by causing the identification information and the network connectivity information to be communicated to the messaging device.

A mobile device according to the present disclosure comprises: an antenna; a processor; and a memory having computer-readable instructions stored thereon that, when executed by the processor, cause the mobile device to: communicate identification information associated with the mobile device and network connectivity information indicative of whether the mobile device is connected to a wireless network to a registration server configured to store the identification information in a database; and receive a message from a messaging device separate from the mobile device, the messaging device being configured to send the message to the mobile device based on the identification information and the network connectivity information.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting.

NarrowBand Internet-of-Things (NB-IoT) is a standards-based low power wide area (LPWA) technology developed to enable a wide range of new IoT devices and services use NB-IOT (narrow band-internet-of-things) frequency of existing radio bands. Emergency workers are often contacted using mobile phones. But, mobile phone networks are often unreliable. When a mobile phone communication network is down, NB-IOT is often still up and running. As such, a mobile device that is capable of receiving communications on a NarrowBand Internet-of-Things network would help to make emergency workers readily reachable in times of need, regardless of whether a mobile phone communication network is up and running.

Figure 1:
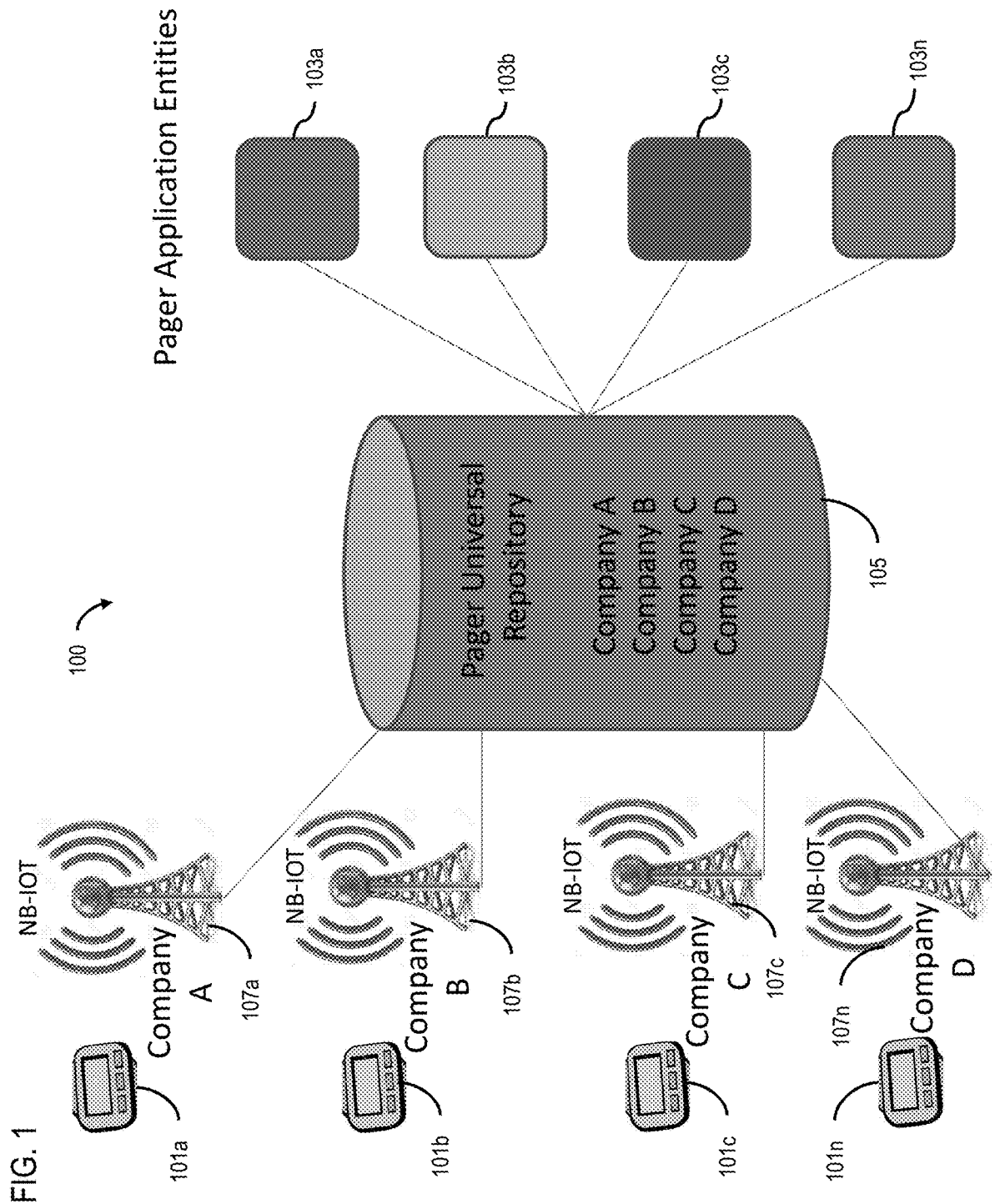
FIG. 1 is a diagram of a messaging system, in accordance with one or more embodiments.

FIG. 1 is a diagram of a messaging system 100, in accordance with one or more embodiments. System 100 comprises mobile devices 101*a*-101*n* (collectively referred to as "mobile device 101"), messaging devices 103*a*-103*n* (collectively referred to as "messaging device 103"), and a registration repository 105.

Mobile device 101 comprises an antenna, a processor and a memory. In some embodiments, mobile device 101 is a pager. Mobile device 101 is configured to communicate with at least one of the messaging devices 103 and the registration repository 105 by way of one or more wireless networks 107*a*-107*n* (collectively referred to as "wireless network 107"). In some embodiments, the wireless network 107 is a NarrowBand Internet-of-Things (NB-IoT) frequency network. Messaging device 103 is configured to receive data messages from the registration repository 105 by way of one or more of wireless network 107, WIFI, some other suitable wireless network, a hard line, LAN, phone, coaxial cable, or other suitable manner by which the messaging device 103 is capable of receiving data from the registration repository 105.

The memory included in the mobile device 101 has computer-readable instructions stored thereon that, when executed by the processor of the mobile device 101, cause mobile device 101 to communicate identification information associated with the mobile device 101 and network connectivity information indicative of whether the mobile device 101 is connected to a wireless network 107 to the registration repository 105. The identification information comprises one or more of a user id, a device id, a telephone number, location information, user subscription information, eligible wireless networks 107 for connection, or other suitable information.

The registration repository 105 is configured to store the identification information and the connectivity information in a database. In some embodiments, registration repository 105 is a pager universal repository (PUR). In some embodiments, registration repository 105 comprises a processor and a memory. In some embodiments, registration repository 105 is associated with a plurality of wireless networks 107 and facilitates connectivity of mobile devices 101 with wireless networks 107 based on which of the networks 107 is available to a mobile device 101 at a given time.

Mobile device 101 is configured to receive a message from messaging device 103. Messaging device 103 is separate from the mobile device 101 and configured to send messages to the mobile device 101 based on the identification information and the network connectivity information. In some embodiments, the mobile device 101 is configured to receive a text message having less than or equal to a predefined maximum quantity of characters capable of being communicated by way of a narrowband internet-of-things frequency network. In some embodiments, mobile device 101 is a pager having a display configured to output the text message. In some embodiments, mobile device 101 comprises an eSIM configured to facilitate connectivity to one or more wireless networks. Mobile device 101 can be on-boarded onto any mobile network around the world and is not limited to any particular proprietary network. In some embodiments, mobile device 101 is configured to switch between wireless networks 107 based on a determination by the mobile device 101 that the mobile device 101 is disconnected from a wireless network 101 or based on a determination that a better wireless network 107 is available based on a relative signal strength or a quality of service.

In some embodiments, if the connectivity information indicates that the mobile device 101 is disconnected from a first wireless network 107a, the mobile device 101 is caused to switch from the first wireless network 107a to a second wireless network 107b based on a determination that the mobile device 101 is disconnected from the first wireless network 107a. The mobile device 101 is configured to cause the registration repository 105 to update the connectivity information to indicate that the mobile device 101 is connected to the second wireless network 107b to facilitate the updated connectivity information being communicated to the messaging device 103 by the registration repository 105.

In some embodiments, if the connectivity information indicates that the mobile device 101 is connected to wireless network 107a, and the mobile device 101 detects other wireless networks 107 are available, the mobile device 101 is configured to assess one or more of the strength of the signal or quality of service of the wireless network and switch from the first wireless network 107a to the second wireless network 107b based on a determination that a signal strength of the second wireless network 107b is greater than a signal strength of the first wireless network 107a. If the mobile device 101 switches networks, mobile device 101 is configured to cause the registration repository 105 to update the connectivity information to indicate that the mobile device 101 is connected to the second wireless network 107b to facilitate the updated connectivity information being communicated to the messaging device 103 by the registration repository 105.

The messaging device 103 is separate from the mobile device 101. In some embodiments, messaging device 103 is a control center, a terminal, a personal computer, a mobile phone, or some other suitable electronic apparatus capable of sending a message to an external receiver. In some embodiments, messaging device 103 has a display configured to output a graphical user interface. The graphical user interface associated with the messaging device 103 is configured to display the identification information and a connectivity status of the mobile devices 101 based on the connectivity information. In some embodiments, the messaging device 103 is configured to communicate a message to one or more mobile devices 101 based on a selection of which mobile devices 101 should receive the message, the selection being made by way of the graphical user interface.

Figure 2A:
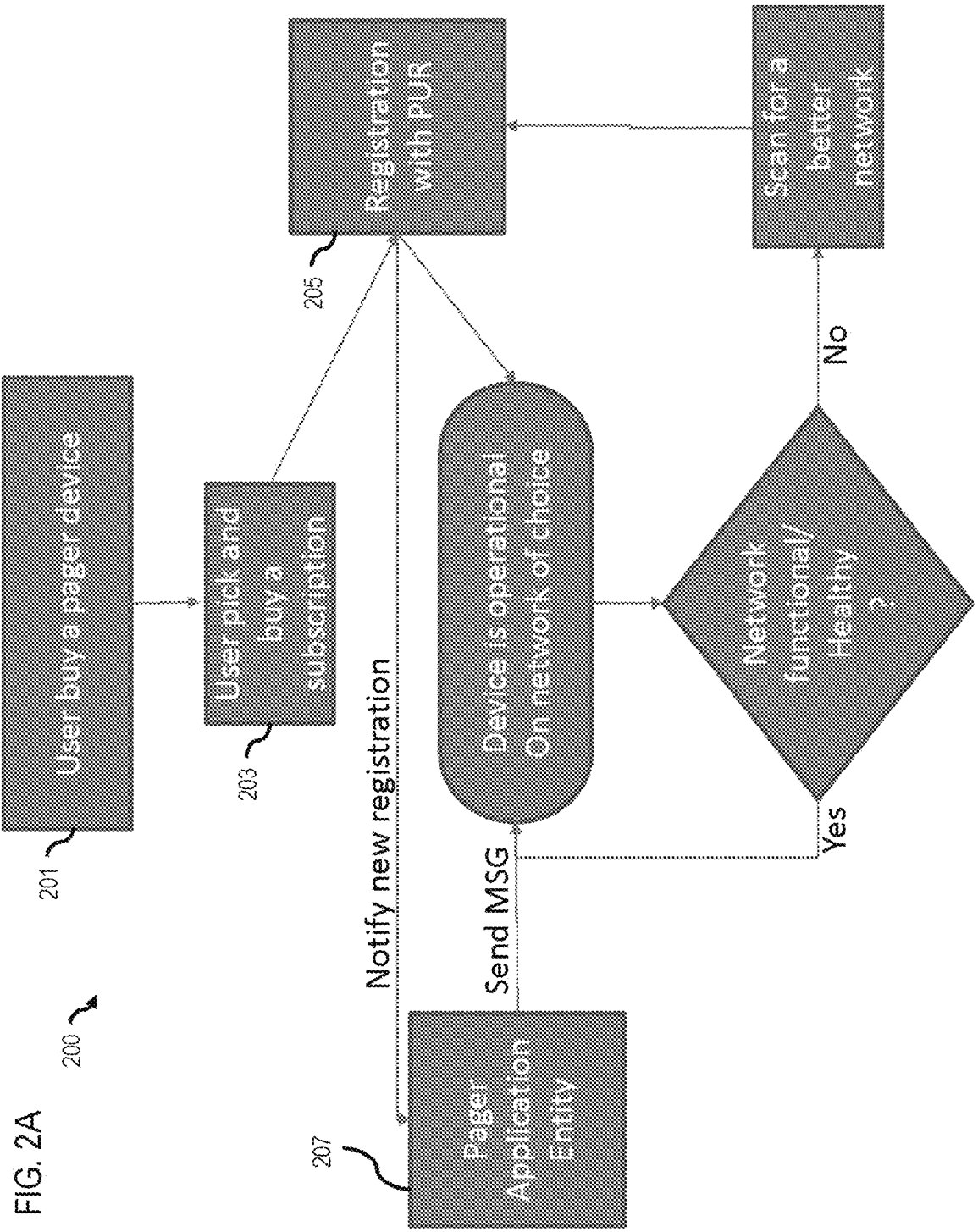
FIGS. 2A and 2B are flowcharts of a messaging method, in accordance with one or more embodiments.
Figure 2B:
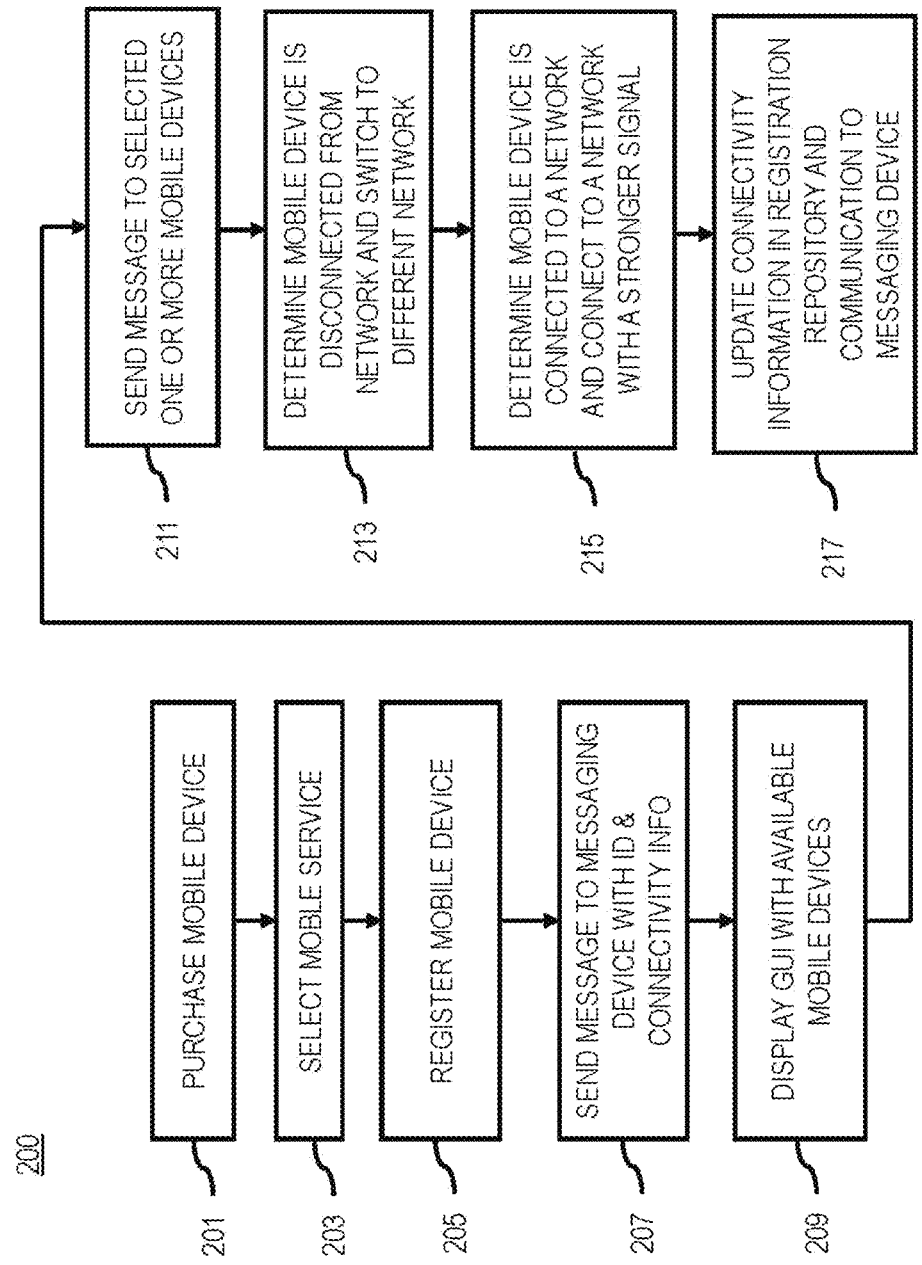

FIGS. 2A and 2B are flowcharts of a messaging method 200, in accordance with one or more embodiments.

In step 201, a user purchases mobile device. In step 203, the user selects one of a plurality of network connectivity options and signs up for a mobile connectivity service. In step 205, the mobile device is caused to be registered in a database by storing identification information associated with the mobile device in the database and storing network connectivity information indicative of whether the mobile device is connected to a wireless network in the database. In step 207, a message is communicated to a messaging device remote from the mobile device comprising data indicative of the identification information and the network connectivity. In step 209, a graphical user interface associated with the messaging device is displayed that indicates the identification information and a connectivity status of one or more mobile device based on the connectivity information, wherein the mobile device is one of a plurality of mobile devices registered in the database, and the graphical user interface displays the identification information and the connectivity status of each mobile device of the plurality of mobile devices.

In step 211, a message is communicated from the messaging device to one or more of the mobile devices based on a selection made at the messaging device to send the message to the one or more mobile devices.

In step 213, if the connectivity information indicates that the mobile device is disconnected from a first network, the mobile device is caused to switch from the first wireless network to a second wireless network based on a determination that the mobile device is disconnected from the first wireless network and the second wireless network is available. In step 215, if the connectivity information indicates that the mobile device is connected to the first network and a second wireless network is available with a stronger signal, the mobile device is caused to switch from the first wireless network to the second wireless network based on a determination that a signal strength of the second wireless network is greater than a signal strength of the first wireless network. In step 217, the connectivity information is caused to be updated to indicate that the mobile device is connected to the second wireless network, and the updated connectivity information is caused to be communicated to the messaging device.

Figure 3:
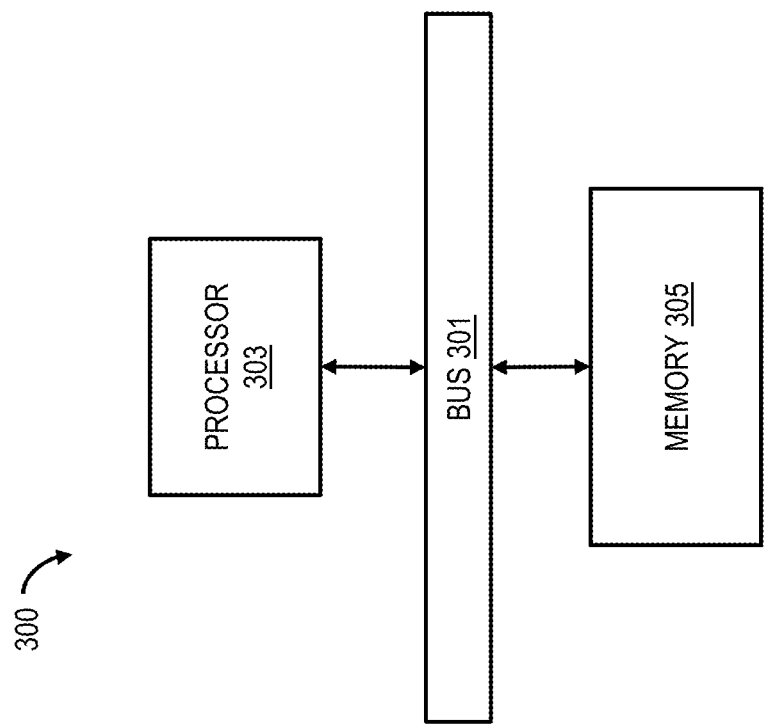
FIG. 3 is a chipset by which one or more embodiments is implemented.

FIG. 3 is a functional block diagram of a computer or processor-based system 300 upon which or by which an embodiment is implemented.

Processor-based system 300 is programmed to facilitate messaging between a messaging device and a mobile device having connectivity by way of a narrowband internet-of-thing frequency network, as described herein, and includes, for example, bus 301, processor 303, and memory 305 components.

In some embodiments, the processor-based system is implemented as a single "system on a chip." Processor-based system 300, or a portion thereof, constitutes a mechanism for performing one or more steps of facilitating messaging between a messaging device and a mobile device having connectivity by way of a narrowband internet-of-thing frequency network.

In some embodiments, the processor-based system 300 includes a communication mechanism such as bus 301 for transferring information and/or instructions among the components of the processor-based system 300. Processor 303 is connected to the bus 301 to obtain instructions for execution and process information stored in, for example, the memory 305. In some embodiments, the processor 303 is also accompanied with one or more specialized components to perform certain processing functions and tasks such as one or more digital signal processors (DSP), or one or more application-specific integrated circuits (ASIC). A DSP typically is configured to process real-world signals (e.g., sound) in real time independently of the processor 303. Similarly, an ASIC is configurable to perform specialized functions not easily performed by a more general purpose processor. Other specialized components to aid in performing the functions described herein optionally include one or more field programmable gate arrays (FPGA), one or more controllers, or one or more other special-purpose computer chips.

In one or more embodiments, the processor (or multiple processors) 303 performs a set of operations on information as specified by a set of instructions stored in memory 305 related to facilitate messaging between a messaging device and a mobile device having connectivity by way of a narrowband internet-of-thing frequency network. The execution of the instructions causes the processor to perform specified functions.

The processor 303 and accompanying components are connected to the memory 305 via the bus 301. The memory 305 includes one or more of dynamic memory (e.g., RAM, magnetic disk, writable optical disk, etc.) and static memory (e.g., ROM, CD-ROM, etc.) for storing executable instructions that when executed perform the steps described herein to facilitate messaging between a messaging device and a mobile device having connectivity by way of a narrowband internet-of-thing frequency network. The memory 305 also stores the data associated with or generated by the execution of the steps.

In one or more embodiments, the memory 305, such as a random access memory (RAM) or any other dynamic storage device, stores information including processor instructions for facilitating messaging between a messaging device and a mobile device having connectivity by way of a narrowband internet-of-thing frequency network. Dynamic memory allows information stored therein to be changed by system 100. RAM allows a unit of information stored at a location called a memory address to be stored and retrieved independently of information at neighboring addresses. The memory 305 is also used by the processor 303 to store temporary values during execution of processor instructions. In various embodiments, the memory 305 is a read only memory (ROM) or any other static storage device coupled to the bus 301 for storing static information, including instructions, that is not changed by the system 100. Some memory is composed of volatile storage that loses the information stored thereon when power is lost. In some embodiments, the memory 305 is a non-volatile (persistent) storage device, such as a magnetic disk, optical disk or flash card, for storing information, including instructions, that persists even when the system 100 is turned off or otherwise loses power.

The term "computer-readable medium" as used herein refers to any medium that participates in providing information to processor 303, including instructions for execution. Such a medium takes many forms, including, but not limited to computer-readable storage medium (e.g., non-volatile media, volatile media). Non-volatile media includes, for example, optical or magnetic disks. Volatile media include, for example, dynamic memory. Common forms of computer-readable media include, for example, a floppy disk, a flexible disk, a hard disk, a magnetic tape, another magnetic medium, a CD-ROM, CDRW, DVD, another optical medium, punch cards, paper tape, optical mark sheets, another physical medium with patterns of holes or other optically recognizable indicia, a RAM, a PROM, an EPROM, a FLASH-EPROM, an EEPROM, a flash memory, another memory chip or cartridge, or another medium from which a computer can read. The term computer-readable storage medium is used herein to refer to a computer-readable medium.

An aspect of this description is related to a messaging method. The method comprises causing a mobile device to be registered in a database by storing identification information associated with the mobile device in the database and storing network connectivity information indicative of whether the mobile device is connected to a wireless network in the database. The method also comprises facilitating a message to be communicated to the mobile device from a messaging device remote from the mobile device by causing the identification information and the network connectivity information to be communicated to the messaging device.

Another aspect of this description is related to a system comprising a mobile device, a messaging device separate from the mobile device, and an apparatus comprising a processor and a memory having computer-readable instructions stored thereon that, when executed by the processor, cause the apparatus to cause the mobile device to be registered in a database by storing identification information associated with the mobile device in the database and storing network connectivity information indicative of whether the mobile device is connected to a wireless network in the database. The apparatus is also caused to facilitate a message to be communicated to the mobile device from the messaging device by causing the identification information and the network connectivity information to be communicated to the messaging device.

Another aspect of this description is related to a mobile device comprising an antenna, a processor, and a memory having computer-readable instructions stored thereon that, when executed by the processor, cause the mobile device to communicate identification information associated with the mobile device and network connectivity information indicative of whether the mobile device is connected to a wireless network to a registration server configured to store the identification information in a database. The mobile device is also caused to receive a message from a messaging device separate from the mobile device, the messaging device being configured to send the message to the mobile device based on the identification information and the network connectivity information.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:

causing a mobile device to be registered in a database by storing identification information associated with the mobile device in the database and storing network connectivity information indicative of whether the mobile device is connected to a wireless network in the database; and facilitating a message to be communicated to the mobile device from a messaging device remote from the mobile device by causing the identification information and the network connectivity information to be communicated to the messaging device, wherein the wireless network is a first wireless network of two or more wireless networks, the network connectivity information indicates that the mobile device is connected to the first network, and the method further comprises:

causing the mobile device to switch from the first wireless network to a second wireless network based on a determination that a signal strength of the second wireless network is greater than a signal strength of the first wireless network;

causing the network connectivity information to be updated to indicate that the mobile device is connected to the second wireless network; and causing the updated network connectivity information to be communicated to the messaging device.

2. The method of claim 1, wherein the wireless network is a narrowband internet-of-things frequency network.

3. The method of claim 1, further comprising:

causing a graphical user interface associated with the messaging device to display the identification information and a connectivity status of the mobile device based on the network connectivity information.

4. The method of claim 3, wherein the mobile device is one of a plurality of mobile devices registered in the database, and the graphical user interface displays the identification information and the connectivity status of each mobile device of the plurality of mobile devices.

5. A system, comprising:

a mobile device;

a messaging device separate from the mobile device; and an apparatus comprising a processor and a memory having computer-readable instructions stored thereon that, when executed by the processor, cause the apparatus to:

cause the mobile device to be registered in a database by storing identification information associated with the mobile device in the database and storing network connectivity information indicative of whether the mobile device is connected to a wireless network in the database; and facilitate a message to be communicated to the mobile device from the messaging device by causing the identification information and the network connectivity information to be communicated to the messaging device, wherein the wireless network is a first wireless network of two or more wireless networks, the network connectivity information indicates that the mobile device is connected to the first network, and the apparatus is further caused to:

cause the mobile device to switch from the first wireless network to a second wireless network based on a determination that a signal strength of the second wireless network is greater than a signal strength of the first wireless network;

cause the network connectivity information to be updated to indicate that the mobile device is connected to the second wireless network; and cause the updated network connectivity information to be communicated to the messaging device.

6. The system of claim 5, wherein the wireless network is a narrowband internet-of-things frequency network.

7. The system of claim 5, wherein the apparatus is further caused to:

cause a graphical user interface associated with the messaging device to display the identification information and a connectivity status of the mobile device based on the network connectivity information.

8. The system of claim 7, wherein the mobile device is one of a plurality of mobile devices registered in the database, and the graphical user interface displays the identification information and the connectivity status of each mobile device of the plurality of mobile devices.

9. The system of claim 8, wherein the messaging device is configured to communicate the message to one or more mobile devices of the plurality of mobile devices based on a selection of which mobile devices should receive the message, the selection being made by way of the graphical user interface.

10. A mobile device, comprising:

an antenna;

a processor; and a memory having computer-readable instructions stored thereon that, when executed by the processor, cause the mobile device to:

communicate identification information associated with the mobile device and network connectivity information indicative of whether the mobile device is connected to a wireless network to a registration server configured to store the identification information in a database; and receive a message from a messaging device separate from the mobile device, the messaging device being configured to send the message to the mobile device based on the identification information and the network connectivity information, wherein the wireless network is a first wireless network of two or more wireless networks, the network connectivity information indicates that the mobile device is connected to the first network, and the mobile device is further caused to:

switch from the first wireless network to a second wireless network based on a determination that a signal strength of the second wireless network is greater than a signal strength of the first wireless network; and cause the network connectivity information to be updated to indicate that the mobile device is connected to the second wireless network to facilitate the updated network connectivity information being communicated to the messaging device by the registration server.

11. The mobile device of claim 10, wherein the wireless network is a narrowband internet-of-things frequency network.

12. The mobile device of claim 11, wherein the mobile device is configured to receive a text message having less than or equal to a predefined maximum quantity of characters capable of being communicated by way of the narrowband internet-of-things frequency network.

13. The mobile device of claim 12, wherein the mobile device is a pager having a display configured to output the text message.

14. The mobile device of claim 10, further comprising:
an eSIM configured to facilitate connectivity to one or more wireless networks.

\* \* \* \* \*